(12) United States Patent
Kim

(10) Patent No.: US 10,005,517 B2
(45) Date of Patent: Jun. 26, 2018

(54) BICYCLE PEDAL EQUIPPED WITH CENTER-OF-GRAVITY CHANGING MEANS

(71) Applicant: Hark Moo Kim, Yongin-si (KR)

(72) Inventor: Hark Moo Kim, Yongin-si (KR)

( * ) Notice: Subject to any disclaimer, the term of this patent is extended or adjusted under 35 U.S.C. 154(b) by 0 days. days.

(21) Appl. No.: 15/468,200

(22) Filed: Mar. 24, 2017

(65) Prior Publication Data
US 2018/0086416 A1 Mar. 29, 2018

(30) Foreign Application Priority Data

Sep. 23, 2016 (KR) .................. 10-2016-0122132

(51) Int. Cl.
*B62M 3/08* (2006.01)
(52) U.S. Cl.
CPC ..................... *B62M 3/08* (2013.01)
(58) Field of Classification Search
CPC ........... B62M 3/08; B62M 3/086; B62M 3/10
See application file for complete search history.

(56) References Cited

U.S. PATENT DOCUMENTS

| | | | | |
|---|---|---|---|---|
| 614,900 | A * | 11/1898 | Seaver | B62M 3/08 280/259 |
| 4,599,915 | A * | 7/1986 | Hlavac | B62M 3/08 74/594.4 |
| 5,449,332 | A * | 9/1995 | Hervig | A63B 22/0046 482/57 |
| 5,901,617 | A * | 5/1999 | Hervig | B62M 3/08 482/57 |
| 6,688,192 | B1 * | 2/2004 | Badarneh | A63B 22/16 74/594.4 |
| 7,300,387 | B2 * | 11/2007 | Wang | A63B 22/001 482/52 |

FOREIGN PATENT DOCUMENTS

| | | |
|---|---|---|
| KR | 20-0226194 Y1 | 7/2001 |
| KR | 10-2012-0068055 A | 6/2012 |
| KR | 20-2012-0005513 U | 7/2012 |

* cited by examiner

*Primary Examiner* — Thomas C Diaz
(74) *Attorney, Agent, or Firm* — KORUS Patent, LLC; Seong Il Jeong

(57) ABSTRACT

Disclosed herein is a bicycle pedal equipped with a center-of-gravity changing means. The bicycle pedal is coupled to a crank arm of a bicycle. The bicycle pedal includes: a pedal unit including a rectangular pedal body coupled to one surface of the crank arm, and a rotation cavity formed through the top and bottom surfaces of the inside of the pedal body; and a center-of-gravity changing means provided above the pedal unit, and configured such that a center of gravity is moved forward or backward. The center-of-gravity changing means includes: a rod-shaped rotation changing shaft fitted into the inside surface of the rotation cavity; a rotation changing bent portion formed to protrude in the center of the rotation changing shaft; a plate-shaped rotation changing connection member fitted over the outside surface of the rotation changing bent portion; and a plate-shaped changing foot support provided above the rotation changing connection member.

7 Claims, 6 Drawing Sheets

31 : (311, 312)
32 : (321, 322)

BICYCLE PEDAL EQUIPPED WITH CENTER-OF-GRAVITY CHANGING MEANS

BACKGROUND

1. Technical Field

The present invention relates generally to a bicycle pedal equipped with a center-of-gravity changing means, and more particularly to a bicycle pedal equipped with a center-of-gravity changing means, which enables the center of gravity of a foot placed on the pedal to reciprocate forward and backward during the operation of a bicycle, thereby considerably reducing pedaling fatigue.

2. Description of the Related Art

Recently, the lack of exercise of people today attributable to a highly automated living environment has been supplemented with various types of intentional exercise, and exercising using a bicycle has attracted attention.

Generally, a bicycle is a transportation means that is used to move over a long distance. A bicycle includes: a frame formed in the shape of a skeleton; a saddle provided on top of the frame; wheels attached to the front and back portions of the frame; a drive shaft coupled to any one wheel by a chain on both sides of the frame; crank arms configured to extend from the drive shaft; and pedals each coupled to an end of each of the crank arms.

Meanwhile, to drive a bicycle, a user needs to perform an operation of directly pushing the pedals thereof. Many people perform exercise via the above operation while using bicycles to go to and from work or school or to run daily errands.

In connection with this, Korean Patent Application Publication No. 10-2016-0011385 discloses a conventional bicycle pedal. FIG. 1 is a diagram showing an operation of rotating a conventional bicycle pedal.

The conventional bicycle pedal is configured such that the location of the pedal is changed to enable the pedal to be more conveniently and safely pushed during the operation of a bicycle in various states. However, the conventional bicycle pedal has a problem in that the sole of a foot is continuously located on a specific portion during an operation of pushing the pedal in order to generate the driving force of a bicycle and during an operation of returning the pedal to its original state in order to push the pedal, as shown in FIG. 1, thereby concentrating the force of exercise on the predetermined portion and thus easily causing fatigue.

SUMMARY

The present invention has been conceived to overcome the above-described problem of the conventional art, and an object of the present invention is to provide a bicycle pedal equipped with a center-of-gravity changing means, in which the center-of-gravity changing means configured to move a center of gravity forward or backward is provided above a pedal unit coupled to the crank arm of a bicycle, and thus the pedal is enabled to be pushed with strong force by placing the center of a foot at the center of the pedal during the pushing of the pedal and a foot is allowed to be moved backward during the returning of the pedal, thereby minimizing the fatigue of an ankle.

According to an aspect of the present invention, there is provided a bicycle pedal equipped with a center-of-gravity changing means, the bicycle pedal being coupled to a crank arm of a bicycle, the bicycle pedal including: a pedal unit including a rectangular pedal body coupled to one surface of the crank arm, and a rotation cavity formed through the top and bottom surfaces of the inside of the pedal body in a vertical direction; and a center-of-gravity changing means provided above the pedal unit, and configured such that a center of gravity is moved forward or backward after a foot of a user has been seated thereon; wherein the center-of-gravity changing means includes: a rod-shaped rotation changing shaft fitted into the inside surface of the rotation cavity; a rotation changing bent portion formed to protrude in one direction in the center of the rotation changing shaft; a plate-shaped rotation changing connection member fitted over the outside surface of the rotation changing bent portion; and a plate-shaped changing foot support provided above the rotation changing connection member, and configured such that the foot of the user is seated thereon.

A body bearing may be provided on one side surface of the pedal body so that the pedal body can be rotated, and a cylindrical body connection shaft fitted into the crank arm may be provided within the body bearing.

Rotation bearings may be formed through the inside surface of the rotation cavity so that the rotation changing shaft can be rotated.

A rotation changing bending hole may be formed through one surface of the rotation changing connection member so that the rotation changing bent portion can be inserted into the rotation changing bending hole.

The rotation changing bending hole may be an elongated hole-type bending hole that is formed in a vertical direction so that the height of the changing foot support can be varied.

A rotation changing bearing may be provided in the rotation changing bending hole so that the rotation changing bent portion can be rotated.

Rail guide members may be included between the pedal body and the changing foot support so that the changing foot support can slide in one direction; and each of the rail guide members may include: a lower rail part including a lower rail protrusion configured to protrude from the top surface of the pedal body in an upward direction, and a lower bent configured to be bent from one side surface of the lower rail protrusion in one direction; and an upper rail part including an upper rail protrusion configured to protrude from the bottom surface of the changing foot support in a downward direction, and an upper bent configured to be bent from one side surface of the upper rail protrusion in one direction.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

An embodiment of the present invention will be described in detail with reference to the accompanying drawings below.

Figure 1:
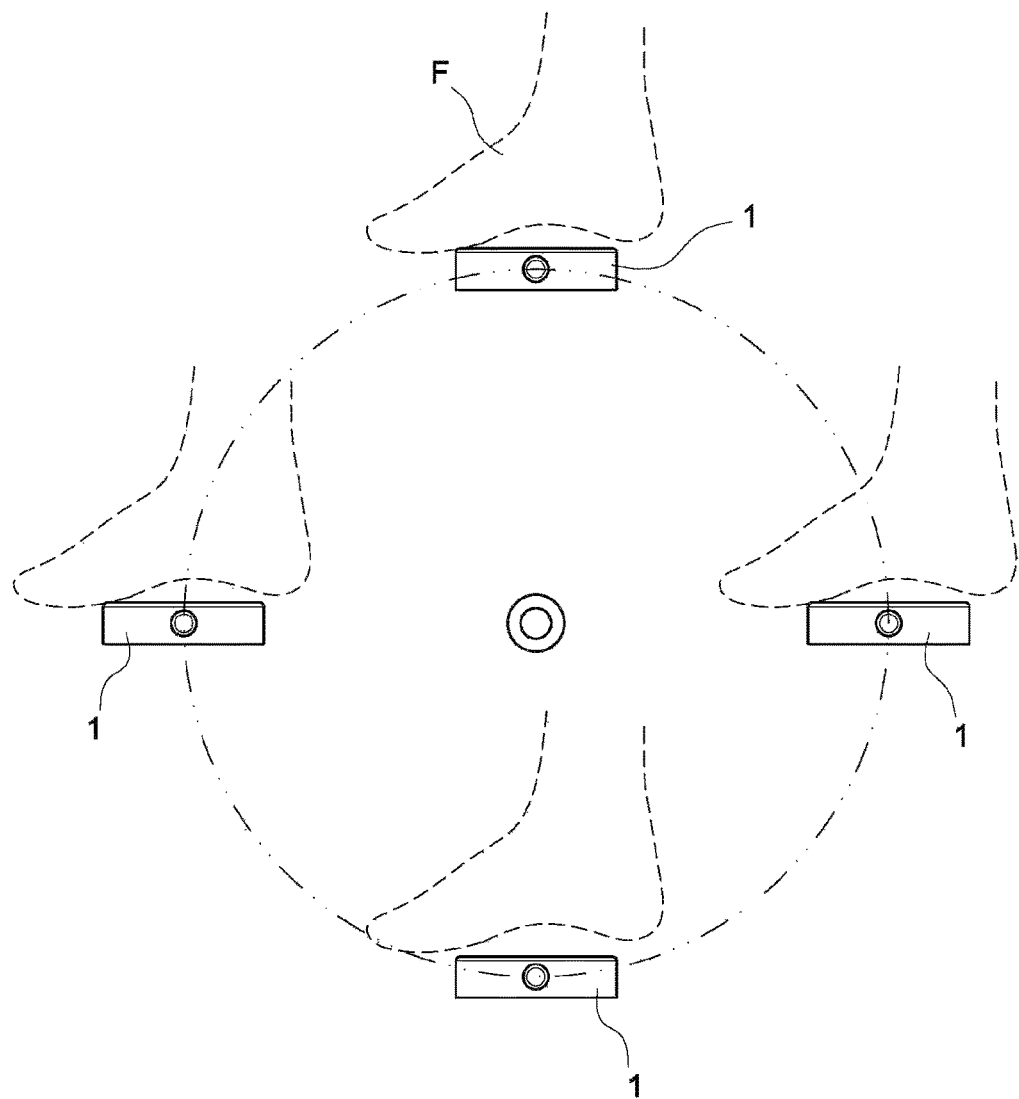
FIG. 1 is a diagram showing an operation of rotating a conventional bicycle pedal.
Figure 2:
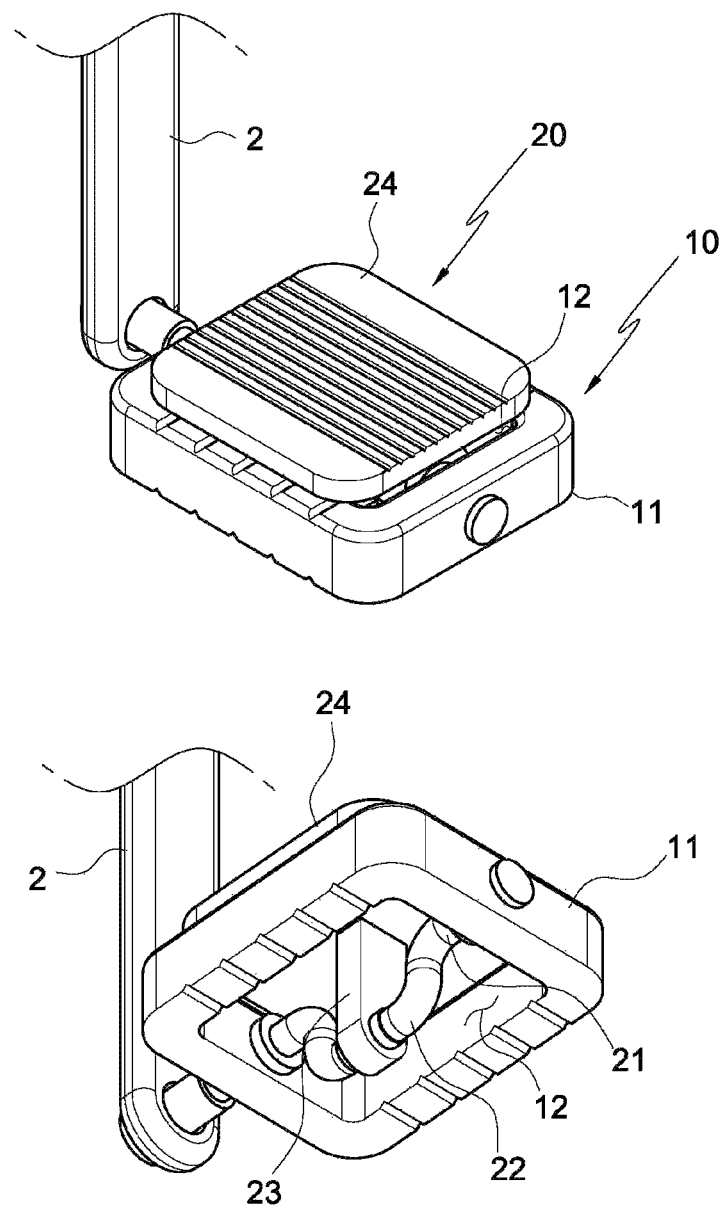
FIG. 2 shows top and upper perspective views of a bicycle pedal according to the present invention.
Figure 3:
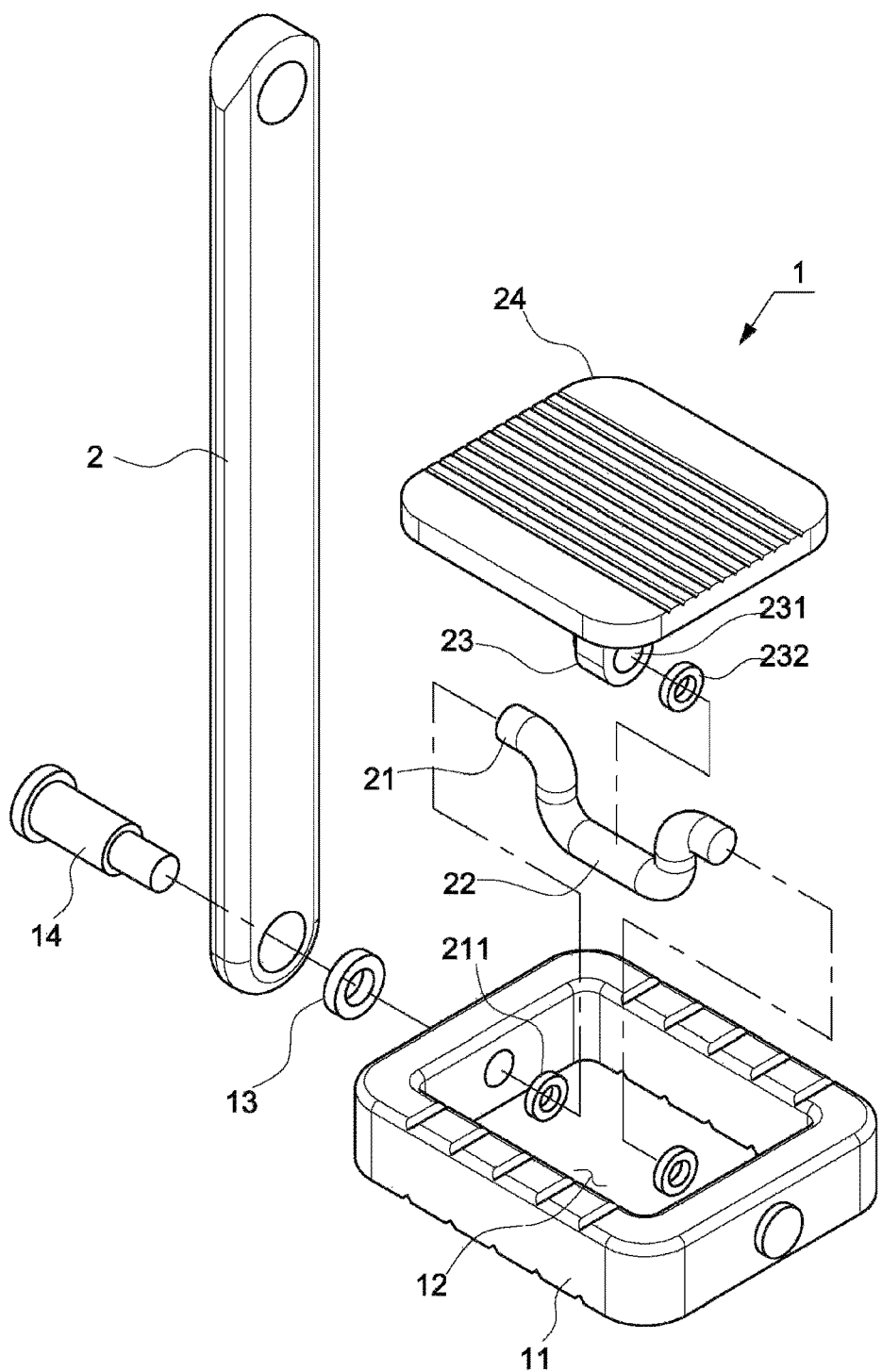
FIG. 3 is an exploded perspective view showing the bicycle pedal according to the present invention.
Figure 4:
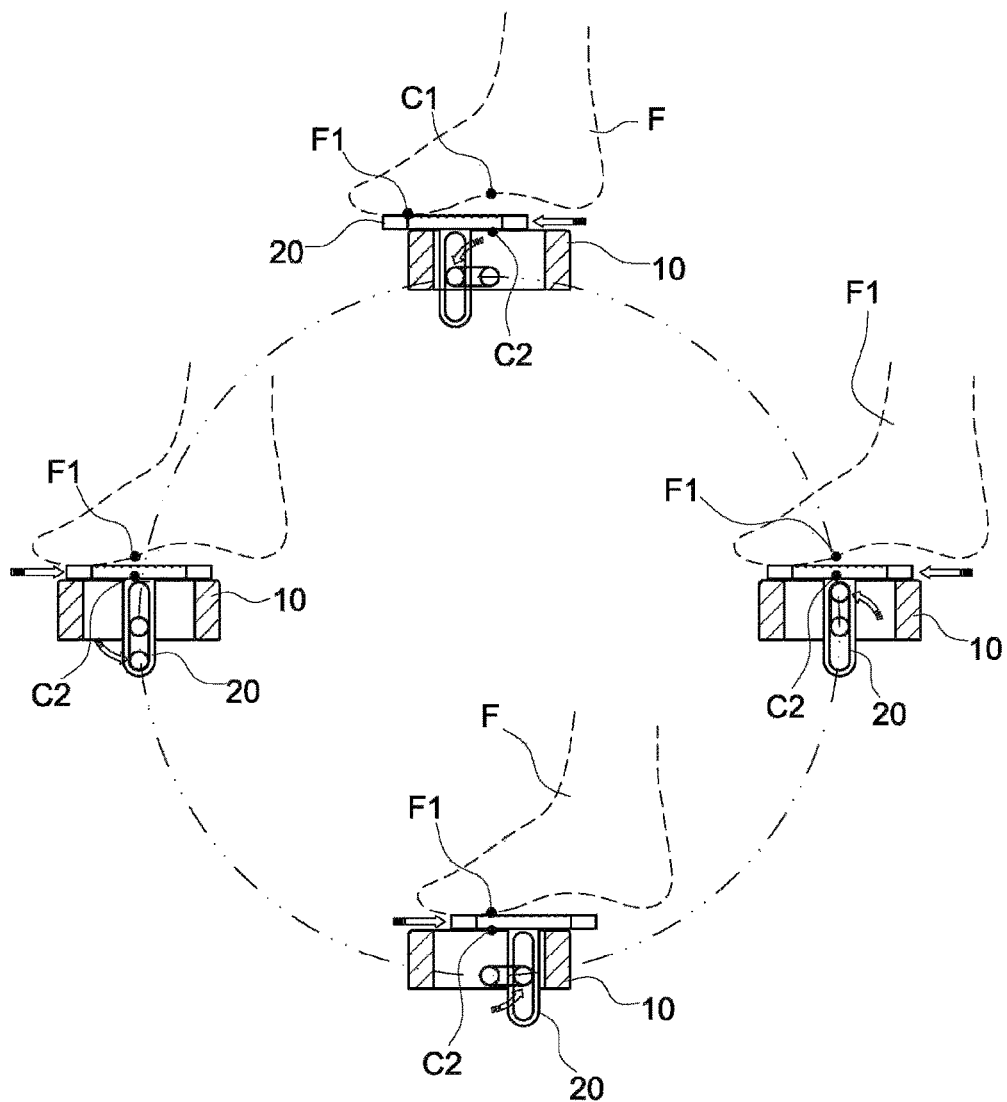
FIG. 4 is a view showing an operation of rotating the bicycle pedal according to the present invention.

As shown in FIGS. 2 to 4, a bicycle pedal equipped with a center-of-gravity changing means according to the present invention is a pedal 1 that is coupled to a crank arm 2 of a bicycle. The bicycle pedal equipped with a center-of-gravity changing means includes: a pedal unit 10 including a rectangular pedal body 11 coupled to one surface of the crank arm 2, and a rotation cavity 12 formed through the top and bottom surfaces of the inside of the pedal body 11 in a vertical direction; and a center-of-gravity changing means 20 provided above the pedal unit 10, and configured such that the center of gravity is moved forward or backward after a foot F of a user has been seated thereon.

In this case, the center-of-gravity changing means 20 includes: a rod-shaped rotation changing shaft 21 fitted into the inside surface of the rotation cavity 12; a rotation changing bent portion 22 formed to protrude in one direction in the center of the rotation changing shaft 21; a plate-shaped rotation changing connection member 23 fitted over the outside surface of the rotation changing bent portion 22; and a plate-shaped changing foot support 24 provided above the rotation changing connection member 23, and configured such that the foot F of the user is seated thereon.

Meanwhile, it is preferred that a ratchet gear-type ratchet means (not shown) is formed on each of both sides of the rotation changing shaft 21 so that the rotation changing shaft 21 can be rotated only in one direction.

Furthermore, a body bearing 13 is provided on one side surface of the pedal body 11 so that the pedal body 11 can be rotated, and a cylindrical body connection shaft 14 fitted into the crank arm 2 is provided within the body bearing 13.

In this case, it is preferred that an opening is formed through one side surface of the pedal body 11 so that the body bearing 13 can be inserted into the opening.

Furthermore, rotation bearings 211 are formed through the inside surface of the rotation cavity 12 so that the rotation changing shaft 21 can be rotated. It is preferred that openings into which the rotation bearings 211 are inserted are formed through the inside surface of the rotation cavity 12.

Furthermore, a rotation changing bending hole 231 is formed through one surface of the rotation changing connection member 23 so that the rotation changing bent portion 22 can be inserted into the rotation changing bending hole 231.

Figure 5:
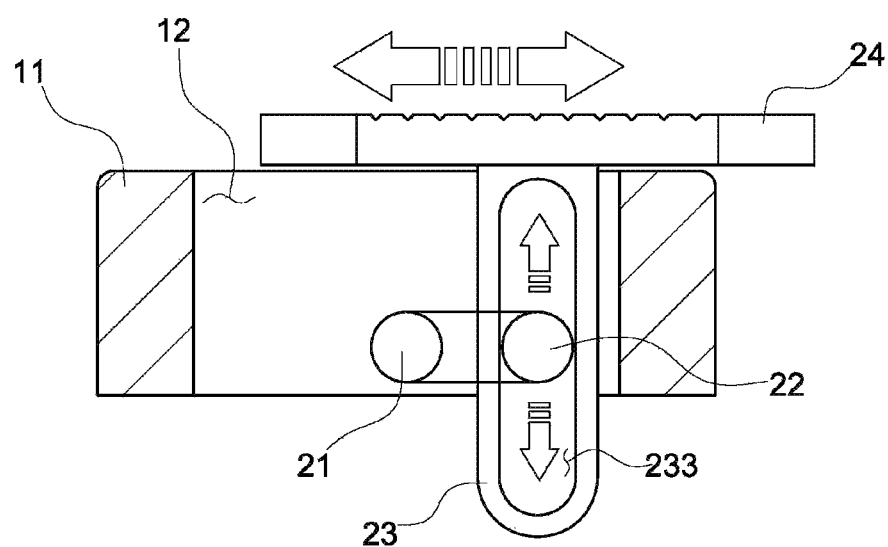
FIG. 5 is a front view showing the operation of an elongated hole-type bending hole according to the present invention.

Meanwhile, as shown in FIG. 5, it is preferred that the rotation changing bending hole 231 is an elongated hole-type bending hole 233 that is formed in a vertical direction so that the height of the changing foot support 24 can be varied.

In this case, a rotation changing bearing 232 is provided in the rotation changing bending hole 231 so that the rotation changing bent portion 22 can be rotated.

Furthermore, rail guide members 30 are included between the pedal body 11 and the changing foot support 24 so that the changing foot support 24 can slide in one direction.

Figure 6:
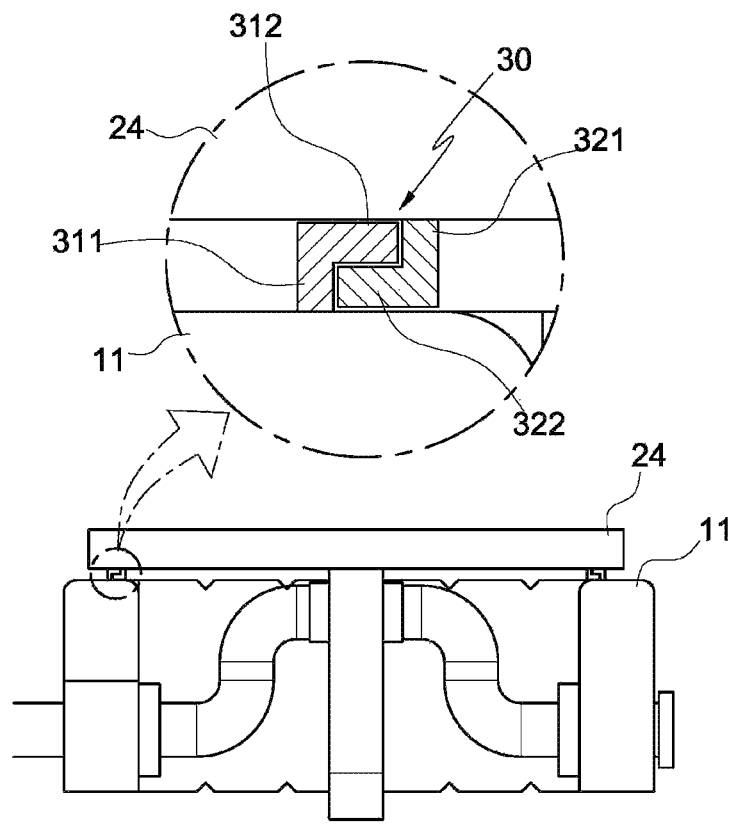
FIG. 6 is a sectional view showing a rail guide member according to the present invention.

In this case, as shown in FIG. 6, each of the rail guide members 30 includes: a lower rail part 31 including a lower rail protrusion 311 configured to protrude from the top surface of the pedal body 11 in an upward direction, and a lower bent 312 configured to be bent from one side surface of the lower rail protrusion 311 in one direction; and an upper rail part 32 including an upper rail protrusion 321 configured to protrude from the bottom surface of the changing foot support 24 in a downward direction, and an upper bent 322 configured to be bent from one side surface of the upper rail protrusion 321 in one direction.

The operation of the bicycle pedal equipped with a center-of-gravity changing means according to the present invention, which is configured as described above, will be described below.

The bicycle pedal equipped with a center-of-gravity changing means according to the present invention is a pedal 1 that is coupled to the crank arm 2 of a bicycle so that a user can place his or her foot on it and then rotate it while pushing it during the riding of the bicycle.

That is to say, as shown in FIG. 4, the center-of-gravity changing means 20 configured to move the center of gravity forward or backward is provided inside the pedal unit 10 coupled to one surface of the crank arm 2. Accordingly, during an ascending operation of strongly pushing the pedal 1, the center C1 of the foot F is located at the center C2 of the pedal unit 10, thereby increasing pushing force applied to the pedal 1 for a bicycle. In contrast, during a descending operation of raising the pedal 1, i.e., an operation of returning the pedal 1 to its original location, the fore portion F1 of the foot F is located at the center C2 of the pedal unit 10, thereby enabling the pedal 1 to be naturally raised.

Accordingly, as in the law of the lever by which generated force varies according to the distance between a point of pushing and a point of application, during the descending of the pedal 1, when the pedal 1 is pushed in the state where the distance between an ankle (point of application) supporting pushing force and the location F1 or C1 of a sole (a point of pushing) seated on the pedal 1 has been minimized, the fatigue of the ankle is minimized, thereby enabling the pedal 1 to be pushed with stronger pushing force.

Furthermore, during the ascending of the pedal 1, i.e., during a returning operation, the radius of rotation of the ankle is increased by maximizing the distance between the location F1 or C2 of the sole (a point of pushing) seated on the pedal 1 and the ankle (a point of application), thereby minimizing the amount of exercise of a leg itself (the distance over which the leg is moved) and thus reducing the fatigue of the leg.

In this case, the center-of-gravity changing means 20 is configured such that the rotation changing bent portion 22 protruding in one direction is formed in the center of the rotation changing shaft 21 coupled to the inside surface of the rotation cavity 12, and thus the location of the changing foot support 24 coupled to the rotation changing bent portion 22 can be varied forward or backward as the rotation changing bent portion 22 is rotated.

Meanwhile, it is preferred that the rotation changing bent portion 22 is in the state of being rotated in a downward direction during the descending operation of the pedal 1, as shown in FIG. 4, and is then rotated in a counterclockwise direction by using the point as a starting point.

Furthermore, although rotatable coupling in the pedal 1 is generally implemented using a cylindrical shaft and an opening to which the shaft is inserted, the body bearing 13, the rotation bearing 211, and the rotation changing bearing 232 are preferably provided in the respective openings in order to increase rotating force, as shown in FIG. 3.

Furthermore, the rail guide members 30 are included between the pedal body 11 and the changing foot support 24, as shown in FIG. 6, so that the changing foot support 24 can slide in one direction, thereby preventing the changing foot support 24 from departing from its location in an upward direction or in one side direction and enabling the changing foot support 24 to more accurately slide in forward and backward directions.

The bicycle pedal equipped with a center-of-gravity changing means according to the present invention has the following effects:

First, the center-of-gravity changing means configured to move a center of gravity forward or backward is provided above the pedal unit coupled to the crank arm of a bicycle, and thus pushing force used to push the pedal is increased by placing the center of gravity of a foot at the center of the pedal during the pushing of the pedal, thereby considerably increasing force used to drive the bicycle.

Second, the center-of-gravity changing means configured to move a center of gravity forward or backward is provided inside the pedal unit coupled to the crank arm of a bicycle, and thus the fore portion of a foot is allowed to be moved to the center of the pedal so that an ankle can be maximally rotated during the returning of the pedal, thereby minimizing pedaling fatigue.

The present invention is not limited to the above-described specific preferred embodiments. It will be apparent to those having ordinary knowledge in the art to which the present invention pertains that various modifications can be made without departing from the gist of the present invention set forth in the attached claims. Such modifications should be construed as falling within the scope of the attached claims.

What is claimed is:

1. A bicycle pedal equipped with a center-of-gravity changing means, the bicycle pedal being coupled to a crank arm of a bicycle, the bicycle pedal comprising:
    a pedal unit including a rectangular pedal body coupled to one surface of the crank arm, and a rotation cavity formed through top and bottom surfaces of an inside of the pedal body in a vertical direction; and
    a center-of-gravity changing means provided above the pedal unit, and configured such that a center of gravity is moved forward or backward after a foot of a user has been seated thereon;
    wherein the center-of-gravity changing means includes: a rod-shaped rotation changing shaft fitted into an inside surface of the rotation cavity; a rotation changing bent portion formed to protrude in one direction in a center of the rotation changing shaft; a plate-shaped rotation changing connection member fitted over an outside surface of the rotation changing bent portion; and a plate-shaped changing foot support provided above the rotation changing connection member, and configured such that the foot of the user is seated thereon.

2. The bicycle pedal of claim 1, wherein a body bearing is provided on one side surface of the pedal body so that the pedal body can be rotated, and a cylindrical body connection shaft fitted into the crank arm is provided within the body bearing.

3. The bicycle pedal of claim 1, wherein rotation bearings are formed through the inside surface of the rotation cavity so that the rotation changing shaft can be rotated.

4. The bicycle pedal of claim 1, wherein a rotation changing bending hole is formed through one surface of the rotation changing connection member so that the rotation changing bent portion can be inserted into the rotation changing bending hole.

5. The bicycle pedal of claim 4, wherein the rotation changing bending hole is an elongated hole-type bending hole that is formed in a vertical direction so that a height of the changing foot support can be varied.

6. The bicycle pedal of claim 4, wherein a rotation changing bearing is provided in the rotation changing bending hole so that the rotation changing bent portion can be rotated.

7. The bicycle pedal of claim 1, wherein:
    rail guide members are included between the pedal body and the changing foot support so that the changing foot support can slide in one direction; and
    each of the rail guide members includes: a lower rail part including a lower rail protrusion configured to protrude from a top surface of the pedal body in an upward direction, and a lower bent configured to be bent from one side surface of the lower rail protrusion in one direction; and an upper rail part including an upper rail protrusion configured to protrude from a bottom surface of the changing foot support in a downward direction, and an upper bent configured to be bent from one side surface of the upper rail protrusion in one direction.

* * * * *